United States Patent
Wu

(10) Patent No.: US 12,438,387 B2
(45) Date of Patent: Oct. 7, 2025

(54) MANAGING CHARGING OF A BATTERY OF AN INFORMATION HANDLING SYSTEM

(71) Applicant: Dell Products L.P., Round Rock, TX (US)

(72) Inventor: Chung Shou Wu, Taipei (TW)

(73) Assignee: Dell Products L.P., Round Rock, TX (US)

( * ) Notice: Subject to any disclaimer, the term of this patent is extended or adjusted under 35 U.S.C. 154(b) by 681 days.

(21) Appl. No.: 17/807,164

(22) Filed: Jun. 16, 2022

(65) Prior Publication Data
US 2023/0411983 A1 Dec. 21, 2023

(51) Int. Cl.
*H02J 7/00* (2006.01)

(52) U.S. Cl.
CPC ........ *H02J 7/00712* (2020.01); *H02J 7/0071* (2020.01)

(58) Field of Classification Search
USPC ........................................... 320/106
See application file for complete search history.

(56) References Cited

U.S. PATENT DOCUMENTS

| 7,528,574 B1* | 5/2009 | Adkins | H02J 7/0071 320/128 |
| 2009/0289604 A1* | 11/2009 | Carkner | H02J 7/0071 320/160 |
| 2022/0239136 A1* | 7/2022 | Fasching | B60L 58/21 |

* cited by examiner

Primary Examiner — Julian D Huffman
Assistant Examiner — Ryu-Sung P. Weinmann
(74) Attorney, Agent, or Firm — McDermott Will & Schulte LLP

(57) ABSTRACT

Method of managing charging of a battery, including: determining that the battery is in a standard charging mode, and in response: for a first time interval, charging the battery with a first power provided by a power supply unit (PSU), the first power associated with the standard charging mode; determining that the first time interval has elapsed, and in response, for a second time interval after the first time interval: determining whether the battery is in a constant voltage mode or a constant current mode; in response to determining that the battery is in the constant voltage mode: determining a current voltage of the battery; determining an offset voltage based on the current voltage of the battery and a current output voltage of the PSU; and charging the battery with a second power provided by the PSU, the second power based on the offset voltage.

18 Claims, 3 Drawing Sheets

MANAGING CHARGING OF A BATTERY OF AN INFORMATION HANDLING SYSTEM

BACKGROUND

Field of the Disclosure

The disclosure relates generally to an information handling system, and in particular, charging of a battery of the information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Adapter (power supply unit) charging capabilities of information handling systems can be small; however, battery size is increased to larger battery capacity than ever before as the user need of longer battery life has increased in recent years. With this combination of small adapter and large battery capacity, it is difficult to achieve fast charging of the battery.

SUMMARY

Innovative aspects of the subject matter described in this specification may be embodied in a method of managing charging of a battery of an information handling system, including determining that the battery is in a standard charging mode; in response to determining that the battery is in the standard charging mode: for a first time interval, charging the battery with a first power provided by a power supply unit (PSU), the first power associated with the standard charging mode; determining that the first time interval has elapsed; in response to determining that the first time interval has elapsed, for a second time interval after the first time interval: determining whether the battery is in a constant voltage mode or a constant current mode; in response to determining that the battery is in the constant voltage mode: determining a current voltage of the battery; determining an offset voltage based on the current voltage of the battery and a current output voltage of the PSU; and charging the battery with a second power provided by the PSU, the second power based on the offset voltage.

Other embodiments of these aspects include corresponding systems, apparatus, and computer programs, configured to perform the actions of the methods, encoded on computer storage devices.

These and other embodiments may each optionally include one or more of the following features. For instance, during the second time interval, determining that a power parameter of the second power is less than a protection parameter, and in response, re-determining whether the battery is in the constant voltage mode or the constant current mode. During the second time interval, determining that a power parameter of the second power is greater than a protection parameter, and in response, charging the battery with the first power provided by the PSU. In response to determining that the battery is in the constant current mode, charging the battery with a third power provided by the PSU, the third power being a peak power of the PSU. During the second time interval, determining that a power parameter of the second power is less than a protection parameter, and in response, re-determining whether the battery is in the constant voltage mode or the constant current mode. During the second time interval, determining that a power parameter of the second power is greater than a protection parameter, and in response, charging the battery with the first power provided by the PSU. Determining that the second time interval has elapsed; in response to determining that the second time interval has elapsed: determining that the battery is in the standard charging mode; in response to determining that the battery is in the standard charging mode: for a third time interval after the second time interval, charging the battery with the first power provided by the PSU, wherein the third time interval is a same magnitude as the first time interval. Determining a charging capability of the PSU; comparing the charging capability of the PSU to a threshold; and determining that the charging capability of the PSU is less than a threshold, and in response, charging the battery with the first power provided by the PSU. Determining that the charging capability of the PSU is greater than the threshold, and in response, determining whether the PSU supports charging the battery at a power greater than the first power; in response to determining that the PSU supports charging the battery at a power greater than the first power, determining that the battery is in the standard charging mode. Determining that the charging capability of the PSU is greater than the threshold, and in response, determining whether the PSU supports charging the battery at a power greater than the first power; in response to determining that the PSU does not support charging the battery at a power greater than the first power, charging the battery with the first power provided by the PSU. The second power is greater than the first power. The first time interval is greater than the second time interval.

Particular implementations of the subject matter described in this specification can be implemented so as to realize one or more of the following advantages. For example, charging time of a battery of an information handling system is improved.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

Figure 1:
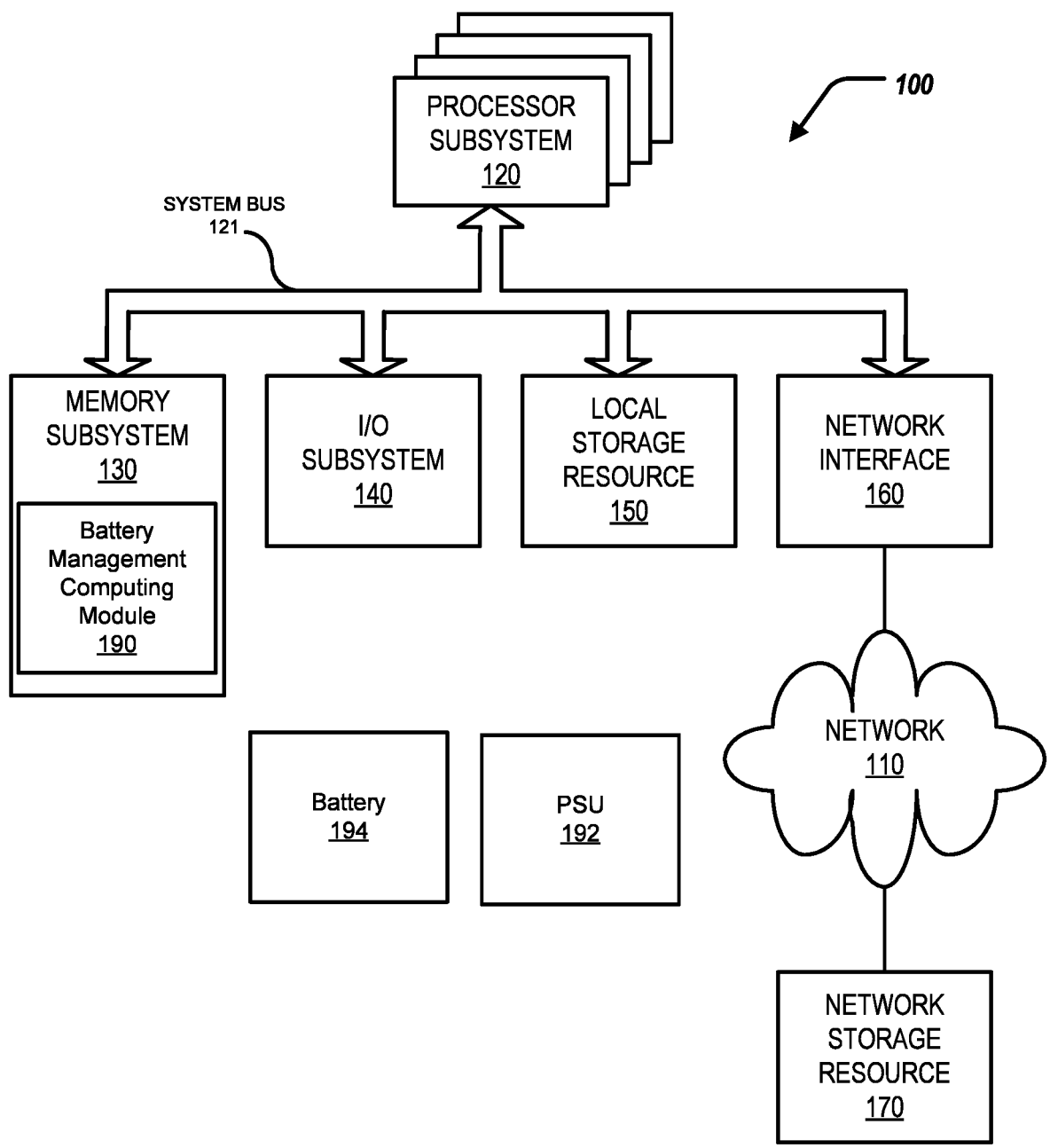
FIG. 1 is a block diagram of selected elements of an embodiment of an information handling system.

This disclosure discusses methods and systems for managing the charging of a battery of an information handling system.

Specifically, this disclosure discusses a system and a method for determining that the battery is in a standard charging mode; in response to determining that the battery is in the standard charging mode: for a first time interval, charging the battery with a first power provided by a power supply unit (PSU), the first power associated with the standard charging mode; determining that the first time interval has elapsed; in response to determining that the first time interval has elapsed, for a second time interval after the first time interval: determining whether the battery is in a constant voltage mode or a constant current mode; in response to determining that the battery is in the constant voltage mode: determining a current voltage of the battery; determining an offset voltage based on the current voltage of the battery and a current output voltage of the PSU; and charging the battery with a second power provided by the PSU, the second power based on the offset voltage.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Figure 2:
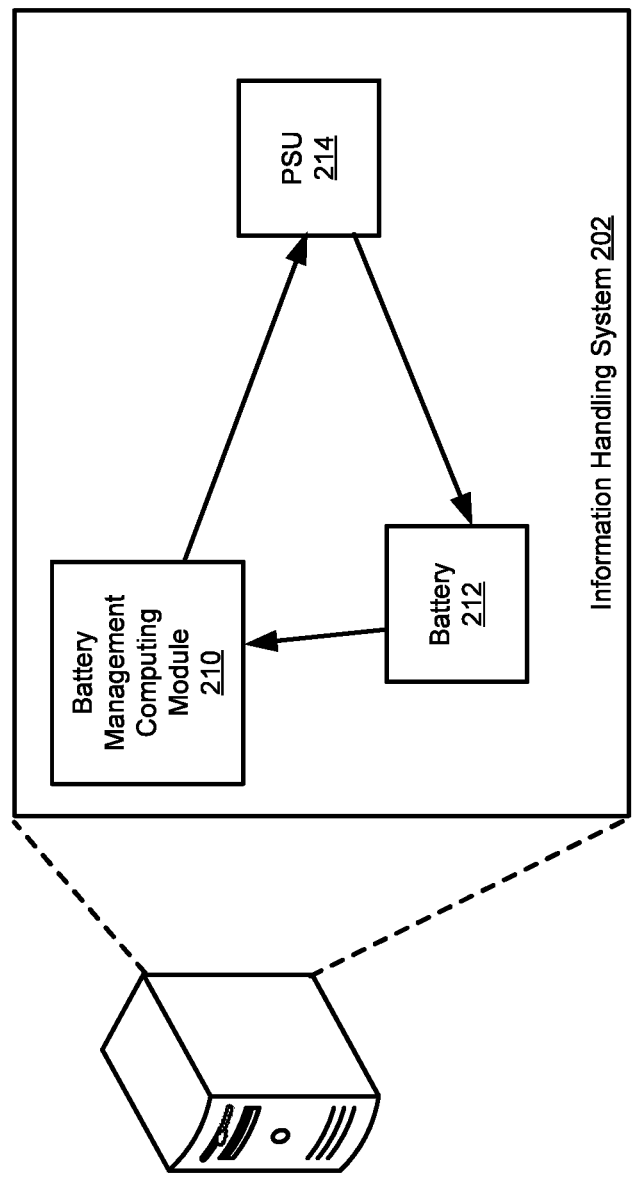
FIG. 2 illustrates a block diagram of an information handling system for managing a charging of a battery.
Figure 3:
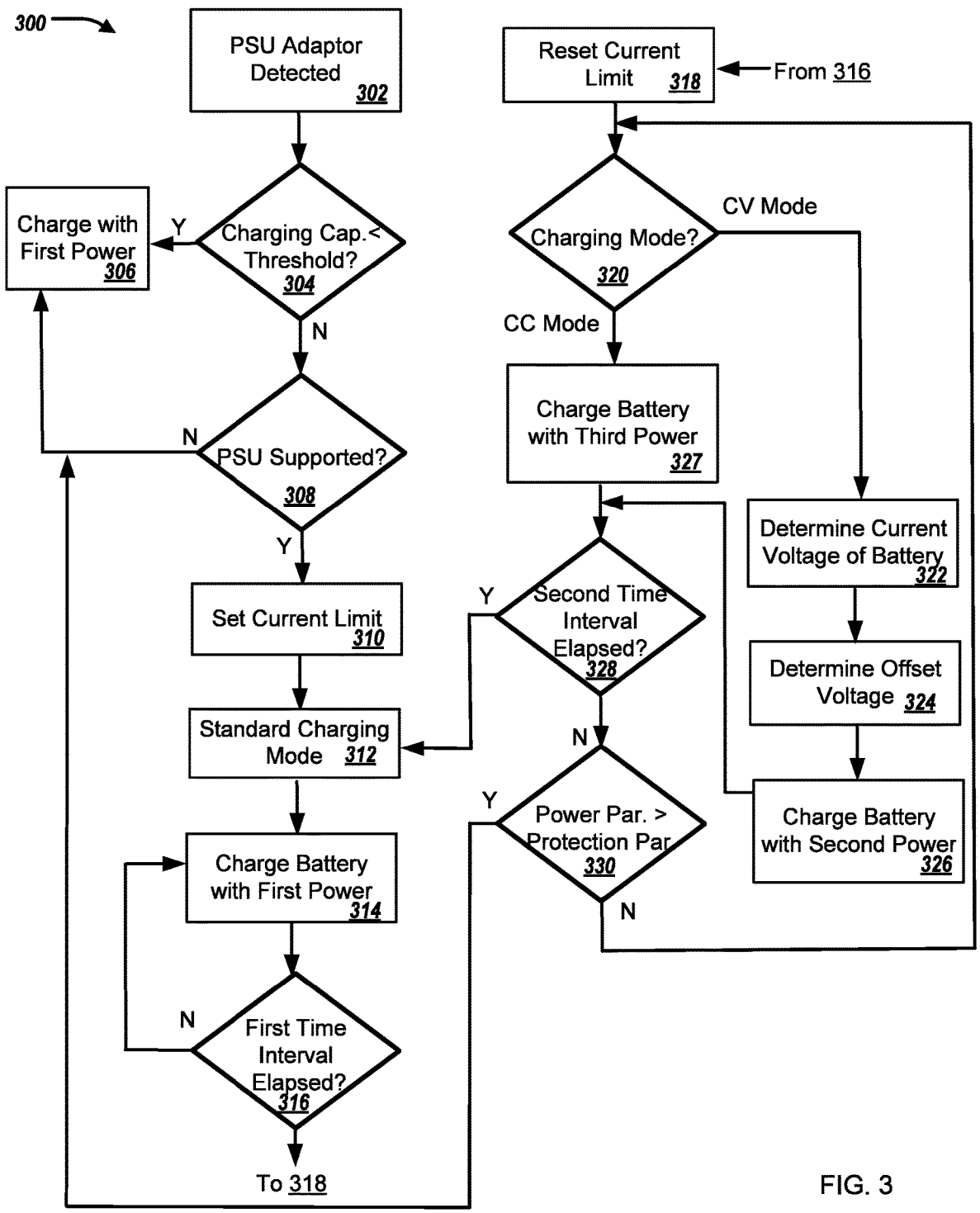
FIG. 3 illustrates a method for managing the charging of a battery of the information handling system.

Particular embodiments are best understood by reference to FIGS. 1-3 wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

The information handling system 100 can also include a battery management computing module 190. The battery management computing module 190 can be included by the memory subsystem 130. The battery management computing module 190 can include a computer-executable program (software). The battery management computing module 190 can be executed by the processor subsystem 120.

The information handling system 100 can further include a power supply unit (PSU) 192 and a battery 194.

In short, the battery management computing module 190 can facilitate the PSU 192 utilizing peak power capability with a voltage compensation algorithm to improve charging time of the battery 194.

Turning to FIG. 2, FIG. 2 illustrates an environment 200 including an information handling system 202. The information handling system 202 can include a battery management computing module 210, a battery 212, and power supply unit (PSU) 214. In some examples, the information handling system 202 is similar to, or includes, the information handling system 100 of FIG. 1. In some examples, the battery management computing module 210 is the same, or substantially the same, as the battery management computing module 190 of FIG. 1. In some examples, the PSU 214 is the same, or substantially the same, as the PSU 192 of FIG. 1. In some examples, the battery 212 is the same, or substantially the same, as the battery 194 of FIG. 1.

The battery management computing module 210 can be in communication with the battery 212 and the PSU 214. The PSU 214 provides charging of the battery 212. The battery management computing module 210 can be in communication with the battery 212 to determine one or more metrics/parameters associated with/of the battery 212, including a current state of charge (SOC) of the battery 212, and/or current voltage.

The battery management computing module 210 can be an embedded controller (EC) of the information handling system 202, or form a portion of the EC.

FIG. 3 illustrates a flowchart depicting selected elements of an embodiment of a method 300 for managing a charging of the battery 212. The method 300 may be performed by the information handling system 100, the information handling system 202, the battery management computing module 210, and/or the PSU 214, and with reference to FIGS. 1-2. It is noted that certain operations described in method 300 may be optional or may be rearranged in different embodiments.

The battery management computing module 210 can detect the PSU 214, at 302. That is, the battery management computing module 210 can detect that a connection is made (coupled) with the PSU 214 and the information handling system 202. In other words, the PSU 214 is "plugged into" the information handling system 202.

The battery management computing module 210 determines a charging capacity of the PSU 214. The charging capability of the PSU 214 can include an amount of power (Watts) output by the PSU 214. The battery management computing module 210 can compare the charging capability of the PSU 214 with a threshold, at 304. For example, the threshold can be 40 Watts; Watts; or 80 Watts. In some examples, the battery management computing module 210 can determine that the charging capacity of the PSU 214 is less than the threshold, and in response, the PSU 214 provides a first charging power to the battery 212 to charge the battery 212, at 306. For example, the charging capacity of the PSU 214 is 45 Watts and the threshold is 65 Watts.

In some examples, the battery management computing module 210 can determine that the charging capacity of the PSU 214 is greater than the than the threshold (at 304), and in response, the battery management computing module 210 can determine whether the PSU 214 supports charging of the battery 212 at a power greater than the first charging power, at 308. For example, the PSU 214 supports "boosted" or "peak" charging. For example, the PSU 214 (e.g., model number) is included on a database list (stored by the information handling system 202). In some examples, the battery management computing module 210 can determine that the PSU 214 does not support charging of the battery 212 at a power greater than the first charging power (at 308), and in response, the PSU 214 provides the first charging power to the battery 212 to charge the battery 212, at 306. For example, the model number of the PSU 214 is not included on the database list.

In some examples, the battery management computing module 210 can determine that the PSU 214 does support charging of the battery 212 at a power greater than the first charging power (at 308), and in response, sets a power limit of the PSU 214, at 310. That is, the battery management computing module 210 sets the power limit of the PSU 214, including a maximum current amperage, and a peak current amperage. Further, the battery management computing module 210 can determine that the PSU 214 does support charging of the battery 212 at a power greater than the first charging power (at 308), and in response, determine that the battery 212 is in a standard charging mode, at 312. The standard charging module can be associated with the first charging power.

In response to determining that the battery 212 is in the standard charging mode, the PSU 214 charges the battery 212 with the first charging power for a first time interval, at 314. In some examples, during a duty cycle associated with charging of the battery 212, the first time interval is a portion of the duty cycle. For example, the first time interval can be 90% of the duty cycle. For example, when the duty cycle is 40 seconds, the first time interval is 36 seconds. For example, a voltage associated with the first charging power is 4 Volts.

The battery management computing module 210 can determine that the first time interval has elapsed, at 316. That is, the first time interval of the duty cycle has elapsed. For example, when the duty cycle is 40 seconds, and the first time interval is 90%, the battery management computing module 210 has determined that 36 seconds have transpired/elapsed.

In response to the first time interval elapsing, the battery management computing module 210 can reset the power limits of the PSU 214, at 318. That is, the battery management computing module 210 resets the power limit of the PSU 214, including the input power rating of the PSU 214.

Further, in response to the first time interval elapsing, for a second time interval after the first time interval, the battery management computing module 210 determines whether the battery 212 is in a constant voltage (CV) mode or a constant current (CC) mode, at 320. The constant voltage mode can regulate a predefined constant voltage to charge the battery 212. In some examples, the battery management computing module 210 can determine that the battery 212 is in the constant voltage mode (at 320), and in response, determine a current voltage of the battery, at 322. That is, the battery management computing module 210 can communicate with the battery 212 over a dedicated interface (SMBUS) to determine parameters of the battery 212, including voltage, state of charge (SOC), and similar. In some examples, during power transmission between the PSU 214 and the battery 212, the distance therebetween can result in power loss (e.g., due to resistive loss/impedance of a physical connection between the PSU 214 and the battery 212).

The battery management computing module 210 can determine an offset voltage based on the current voltage of the battery 212 and a current output voltage of the PSU 214, at 324. In some examples, the battery management computing module 210 can determine a difference between the current output voltage of the PSU 214 and the current voltage of the battery 212. For example, the current output voltage of the PSU 214 can be 4.2 Volts and the current voltage of the battery can be 4 Volts. Thus, due to the resistive loss/impedance between the PSU 214 and the battery 212, there is a 0.2 Voltage drop. The battery management computing module 210 can determine the offset voltage based on a summation of the current output voltage of the PSU 214 and the difference between the current output voltage of the PSU 214 and the current voltage of the battery 212. For example, the battery management computing module can determine the offset voltage as the summation of 4.2 Volts (current output voltage of the PSU 214) and 0.2 Volts (difference between the current output voltage of the PSU 214 and the current voltage of the battery 212), and continuing the example, as 4.4 Volts. The offset voltage compensates for the loss due to the resistive loss/impedance between the PSU 214 and the battery 212.

The battery management computing module 210 provides data indicating the offset voltage to the PSU 214. The PSU 214 charges the battery 212 with a second charging power for the second time interval, at 326. The second charging power is based on the offset voltage. Continuing the example, the PSU 214 charges the battery 212 with the second charging power based on the offset voltage of 4.4 Volts. The second charging power is greater than the first charging power. For example, the second charging power is associated with 4.4 Volts and the first charging power is associated with 4 Volts.

The battery management computing module 210 can determine that the second time interval has not elapsed, at 328. That is, the second time interval of the duty cycle has not elapsed. For example, when the duty cycle is 40 seconds, and the second time interval is 10%, the second time interval can be 4 seconds. In some examples, the first time interval is greater than the second time interval (e.g., 36 seconds is greater than 4 seconds).

The battery management computing module 210, in response to determining that the second time interval has not elapsed (at 328), determines whether a power parameter of the second charging power is less than the protection parameter, at 330. In some examples, the protection parameter can be over current protection (OCP), over temperature protection (OTP), over voltage protection (OVP), and/or under voltage protection (UVP).

In some examples, the battery management computing module 210 can determine that a power parameter of the second charging power is less one or more of a corresponding protection parameter (at 330). The battery management computing module 210, in response to determining that the power parameter of the second charging power is less than one or more of the corresponding protection parameters (at 330), re-determines whether the battery 212 is in the constant voltage mode or the constant current mode, at 320.

In some examples, the battery management computing module 210 can determine that a power parameter of the second charging power is greater than one or more of a corresponding protection parameter (at 330). The battery management computing module 210, in response to determining that the power parameter of the second charging power is greater than one or more of the corresponding protection parameters (at 330), the PSU 214 provides the first charging power to the battery 212 to charge the battery 212, at 306.

In some examples, the battery management computing module 210 can determine that the battery 212 is in the constant current mode (at 320), and in response, the PSU 214 provides a third charging power to the battery 212 to charge the battery 212, at 327. In some examples, the third power is the peak power of the PSU 214. The constant current mode provides a constant current to charge the battery 212.

The battery management computing module 210 can determine that the second time interval has not elapsed, at 328. The battery management computing module 210, in response to determining that the second time interval has not elapsed (at 328), determines whether a power parameter of the third charging power is less than the protection parameter, at 330. In some examples, the battery management computing module 210 can determine that a power parameter of the third charging power is less one or more of a corresponding protection parameter (at 330). The battery management computing module 210, in response to determining that the power parameter of the third charging power is less than one or more of the corresponding protection parameters (at 330), re-determines whether the battery 212 is in the constant voltage mode or the constant current mode, at 320. In some examples, the battery management computing module 210 can determine that a power parameter of the third charging power is greater than one or more of a corresponding protection parameter (at 330). The battery management computing module 210, in response to determining that the power parameter of the third charging power is greater than one or more of the corresponding protection parameters (at 330), the PSU 214 provides the first charging power to the battery 212 to charge the battery 212, at 306.

In some examples, the third charging power is greater than the first charging power.

In some examples, the battery management computing module 210 can determine that the second time interval has elapsed, at 328. That is, the second time interval of the duty cycle has elapsed. For example, when the duty cycle is 40 seconds, and the second time interval is 10%, the battery management computing module 210 has determined that 4 seconds have transpired/elapsed. The battery management computing module 210, in response to determining that the second time interval has elapsed (at 328), determines that the battery 212 is in the standard charging mode, at 312. In response to determining that the battery 212 is in the standard charging mode, the PSU 214 charges the battery 212 with the first charging power for a third time interval after the second time interval, at 314. The third time interval is a same magnitude as the first time interval. In some examples, during a duty cycle, the third time interval is a portion of the duty cycle. For example, the third time interval can be 90% of the duty cycle. For example, when the duty cycle is 40 seconds, the third time interval is 36 seconds.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method of managing charging of a battery of an information handling system, the method comprising:
   determining that the battery is in a standard charging mode;
   in response to determining that the battery is in the standard charging mode:
      for a first time interval, charging the battery with a first power provided by a power supply unit (PSU), the first power associated with the standard charging mode;
      determining that the first time interval has elapsed;
      in response to determining that the first time interval has elapsed, for a second time interval after the first time interval:
         determining whether the battery is in a constant voltage mode or a constant current mode;
         in response to determining that the battery is in the constant voltage mode:
            determining a current voltage of the battery;
            determining an offset voltage based on the current voltage of the battery and a current output voltage of the PSU; and charging the battery with a second power provided by the PSU, the second power based on the offset voltage, the second power greater than the first power,
wherein the first time interval is greater than the second time interval.

2. The method of claim 1, during the second time interval, determining that a power parameter of the second power is less than a protection parameter, and in response, re-determining whether the battery is in the constant voltage mode or the constant current mode.

3. The method of claim 1, during the second time interval, determining that a power parameter of the second power is greater than a protection parameter, and in response, charging the battery with the first power provided by the PSU.

4. The method of claim 1, in response to determining that the battery is in the constant current mode, charging the battery with a third power provided by the PSU, the third power being a peak power of the PSU.

5. The method of claim 4, during the second time interval, determining that a power parameter of the second power is less than a protection parameter, and in response, re-determining whether the battery is in the constant voltage mode or the constant current mode.

6. The method of claim 5, further comprising:
determining that the second time interval has elapsed;
in response to determining that the second time interval has elapsed:
determining that the battery is in the standard charging mode;
in response to determining that the battery is in the standard charging mode:
for a third time interval after the second time interval, charging the battery with the first power provided by the PSU,
wherein the third time interval is a same magnitude as the first time interval.

7. The method of claim 4, during the second time interval, determining that a power parameter of the second power is greater than a protection parameter, and in response, charging the battery with the first power provided by the PSU.

8. The method of claim 1, further comprising:
determining a charging capability of the PSU;
comparing the charging capability of the PSU to a threshold; and
determining that the charging capability of the PSU is less than a threshold, and in response, charging the battery with the first power provided by the PSU.

9. The method of claim 8, further comprising:
determining that the charging capability of the PSU is greater than the threshold, and in response, determining whether the PSU supports charging the battery at a power greater than the first power;
in response to determining that the PSU supports charging the battery at a power greater than the first power, determining that the battery is in the standard charging mode.

10. The method of claim 8, further comprising:
determining that the charging capability of the PSU is greater than the threshold, and in response, determining whether the PSU supports charging the battery at a power greater than the first power;
in response to determining that the PSU does not support charging the battery at a power greater than the first power, charging the battery with the first power provided by the PSU.

11. An information handling system comprising a processor having access to memory media storing instructions executable by the processor to perform operations, comprising:
determining that a battery of the information handling system is in a standard charging mode;
in response to determining that the battery is in the standard charging mode:
for a first time interval, charging the battery with a first power provided by a power supply unit (PSU), the first power associated with the standard charging mode;
determining that the first time interval has elapsed;
in response to determining that the first time interval has elapsed, for a second time interval after the first time interval:
determining whether the battery is in a constant voltage mode or a constant current mode;
in response to determining that the battery is in the constant voltage mode:
determining a current voltage of the battery;
determining an offset voltage based on the current voltage of the battery and a current output voltage of the PSU; and
charging the battery with a second power provided by the PSU, the second power based on the offset voltage, the second power greater than the first power,
wherein the first time interval is greater than the second time interval.

12. The information handling system of claim 11, the operations further comprising during the second time interval, determining that a power parameter of the second power is less than a protection parameter, and in response, re-determining whether the battery is in the constant voltage mode or the constant current mode.

13. The information handling system of claim 11, the operations further comprising during the second time interval, determining that a power parameter of the second power is greater than a protection parameter, and in response, charging the battery with the first power provided by the PSU.

14. The information handling system of claim 11, the operations further comprising in response to determining that the battery is in the constant current mode, charging the battery with a third power provided by the PSU, the third power being a peak power of the PSU.

15. The information handling system of claim 14, the operations further comprising during the second time interval, determining that a power parameter of the second power is less than a protection parameter, and in response, re-determining whether the battery is in the constant voltage mode or the constant current mode.

16. The information handling system of claim 14, the operations further comprising during the second time interval, determining that a power parameter of the second power is greater than a protection parameter, and in response, charging the battery with the first power provided by the PSU.

17. The information handling system of claim 16, the operations further comprising:
determining that the second time interval has elapsed;
in response to determining that the second time interval has elapsed:
determining that the battery is in the standard charging mode;

in response to determining that the battery is in the standard charging mode:
    for a third time interval after the second time interval, charging the battery with the first power provided by the PSU,
    wherein the third time interval is a same magnitude as the first time interval.

18. A non-transitory computer-readable medium storing software comprising instructions executable by one or more computers which, upon such execution, cause the one or more computers to perform operations comprising:
    determining that a battery of an information handling system is in a standard charging mode;
    in response to determining that the battery is in the standard charging mode:
        for a first time interval, charging the battery with a first power provided by a power supply unit (PSU), the first power associated with the standard charging mode;
        determining that the first time interval has elapsed;
        in response to determining that the first time interval has elapsed, for a second time interval after the first time interval:
            determining whether the battery is in a constant voltage mode or a constant current mode;
            in response to determining that the battery is in the constant voltage mode:
                determining a current voltage of the battery;
                determining an offset voltage based on the current voltage of the battery and a current output voltage of the PSU; and
                charging the battery with a second power provided by the PSU, the second power based on the offset voltage, the second power greater than the first power,
        wherein the first time interval is greater than the second time interval.

\* \* \* \* \*